US012654840B2

(12) United States Patent
Bensmann et al.

(10) Patent No.: US 12,654,840 B2
(45) Date of Patent: Jun. 16, 2026

(54) MOVABLE FLOW BODY HAVING A HYBRID LOAD INTRODUCTION RIB

(71) Applicant: Airbus Operations GmbH, Hamburg (DE)

(72) Inventors: Stefan Bensmann, Hamburg (DE); Martin Fees, Hamburg (DE); Alexander Burchard, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 102 days.

(21) Appl. No.: 18/519,459

(22) Filed: Nov. 27, 2023

(65) Prior Publication Data

US 2024/0174345 A1 May 30, 2024

(30) Foreign Application Priority Data

Nov. 30, 2022 (EP) ..................................... 22210465

(51) Int. Cl.
B64C 9/02 (2006.01)
B64C 9/24 (2006.01)

(52) U.S. Cl.
CPC . B64C 9/02 (2013.01); B64C 9/24 (2013.01)

(58) Field of Classification Search
CPC ............... B64C 9/02; B64C 9/22; B64C 9/24
See application file for complete search history.

(56) References Cited

U.S. PATENT DOCUMENTS 3,504,870 A * 4/1970 Weiland .................... B64C 3/48
244/210

3,847,369 A * 11/1974 Phillips ..................... B64C 9/24
244/210
4,171,787 A * 10/1979 Zapel ........................ B64C 3/48
244/214
4,848,707 A * 7/1989 Britton ..................... B64C 9/22
244/214
4,880,189 A * 11/1989 Day .......................... B64C 9/22
244/214
9,598,167 B2 * 3/2017 Grip ......................... B64C 3/26
11,383,821 B2 7/2022 Bensmann et al.
(Continued)

FOREIGN PATENT DOCUMENTS

EP 3674203 A1 7/2020
EP 3712055 A1 9/2020

OTHER PUBLICATIONS

European Search Report for corresponding European Patent Application No. 22210465.5 dated May 4, 2023; priority document.

*Primary Examiner* — William L Gmoser
(74) *Attorney, Agent, or Firm* — Greer, Burns & Crain, Ltd.

(57) ABSTRACT

A movable flow body for an aircraft including a front skin having an outer surface configured to be contacted by an ambient flow, and an inner surface opposite the outer surface, at least one load introduction rib having a skin interface side and a drive side, at least one coupling element arranged on the drive side for coupling with a drive mechanism, and at least one interface element removably attached to the front skin interface side. The at least one interface element includes a bonding surface having a shape corresponding to the shape of the inner surface of the front skin. The at least one interface element is materially bonded to the inner surface of the front skin.

14 Claims, 2 Drawing Sheets

(56) References Cited

U.S. PATENT DOCUMENTS

| 2018/0086432 | A1  |         | 3/2018  | Schlipf et al. |            |
|--------------|-----|---------|---------|----------------|------------|
| 2019/0071166 | A1* |         | 3/2019  | Erban          | B64C 3/50  |
| 2020/0207457 | A1  |         | 7/2020  | Bensmann       |            |
| 2020/0231271 | A1* |         | 7/2020  | Everaert       | B64C 3/187 |
| 2020/0377195 | A1* | 12/2020 |         | Dovey          | B64C 9/323 |
| 2021/0206473 | A1* |         | 7/2021  | Godfroid       | B64C 9/22  |
| 2023/0249804 | A1* |         | 8/2023  | Tsai           | B64C 9/18  |
|              |     |         |         |                | 244/131    |

* cited by examiner

MOVABLE FLOW BODY HAVING A HYBRID LOAD INTRODUCTION RIB

CROSS-REFERENCES TO RELATED APPLICATIONS

This application claims the benefit of the European patent application No. 22210465.5 filed on Nov. 30, 2022, the entire disclosures of which are incorporated herein by way of reference.

FIELD OF THE INVENTION

The invention relates to a movable flow body for an aircraft, a wing for an aircraft as well as an aircraft.

BACKGROUND OF THE INVENTION

For increasing the lift coefficient of a wing of an aircraft, high-lift systems are known. These often include trailing edge flaps and movable leading-edge devices, which are selectively operable. For example, they are usually activated during takeoff and landing, i.e., moved from a retracted into an extended position.

Leading-edge devices may include leading-edge slats, which are flow bodies usually having a front skin, a back skin, and mechanical interfaces for coupling with a slat track or another drive mechanism. One or several ribs are often provided inside the flow bodies for stiffening and for carrying the skins, wherein the front skin is usually riveted to the ribs. The mechanical interfaces may include a dedicated load introduction rib that is connectable to the drive mechanism. Due to the expected loads, a load introduction rib is usually made from a metallic material, such as aluminum. Riveting a rib to a skin that is directly exposed to an ambient airflow may lead to slight imperfections on the skin that may increase the induced drag. Thus, a common joint to connect a rib to a skin of a flow body may require an elaborate reworking and coating to minimize the induced drag Exemplarily, EP 3 712 055 A1 proposes a wing leading-edge device comprising a flow body having a front side, a back side and a plurality of ribs arranged in the flow body, wherein at least one of the ribs is a load introduction rib comprising at least one first lug for coupling with a drive mechanism. The device further comprises a second load path component having at least one second lug, wherein the second load path component is at least connected to the load introduction rib, such that a second opening of the at least one second lug is co-axial with a first opening of the at least one first lug.

SUMMARY OF THE INVENTION

It is an object of the invention to propose an alternative leading-edge device that has a reduced induced drag.

A movable flow body for an aircraft is proposed, comprising a front skin having an outer surface configured to be contacted by an ambient flow, and an inner surface opposite the outer surface, at least one load introduction rib having a skin interface side and a drive side, at least one coupling element arranged on the drive side for coupling with a drive mechanism, and at least one interface element removably attached to the front skin interface side, wherein the at least one interface element comprises a bonding surface having a shape corresponding to the shape of the inner surface of the front skin, and wherein the at least one interface element is materially bonded to the inner surface of the front skin.

The flow body may comprise an elongate shape that is intended for extending along a spanwise direction of the wing to which it is attached. The flow body further comprises a certain profile contour, which is mainly determined by the desired aerodynamic characteristics. It is preferred that the flow body is sufficiently stiff to serve for the intended purpose. It is conceivable that the flow body comprises a plurality of stiffening elements, such as ribs, spars, and stringers, which are distributed inside the flow body.

It is conceivable that the at least one load introduction rib refers to two or more load introduction ribs, if a flow body with a larger spanwise extension is considered. The load introduction rib is mechanically adapted for providing a reliable load transfer between the flow body and the drive mechanism, such as a slat track mechanism or similar. The coupling element is provided at the drive side of the load introduction rib and may include at least one of a variety of different mechanical elements that allow to couple the load introduction body with the drive mechanism. The skin interface side, however, is dedicated for the attachment of the load introduction rib to the front skin through the respective at least one interface element. The skin interface side may be arranged at a distance to the drive side, for example opposite to the drive side. The skin interface side comprises at least one interface element, which is materially bonded to the front skin.

For providing a material bonding, the at least one interface element comprises the bonding surface, which is shaped in a way that it is flushly placeable onto the inner surface of the front skin in a predetermined bonding region. Thus, if the front skin is curved, the bonding surface is curved in the same manner.

The at least one interface element may comprise a design that is compatible with the design of the load introduction rib. For example, the load introduction rib mainly comprises a flat shape with one or a plurality of cantilevers. The at least one interface element may be based on a material sheet having a sufficient material thickness and two sections that include the attachment surface and the bonding surface.

Materially bonding the bonding surface and the inner surface may be conducted by one of several possible processes that allow to provide a sufficiently sturdy connection of the interface element and the front skin. For example, the interface element and the inner surface may be bonded by gluing, welding, or co-curing. In all cases, a riveting connection between the interface element and the front skin can be eliminated, which leads to a clean outer surface of the front skin and an elimination of induced drag stemming from rivets.

The attachment of the at least one interface element and the load introduction rib may be conducted through common mechanical fasteners, such as bolts, screws, nuts, rivets and the like. Since these mechanical fasteners are arranged inside the flow body, they do not protrude into the air flow and thus do not influence the aerodynamic behavior of the flow body. Thus, the number, size and shape of fasteners does not need to be strictly limited to limit the generation of induced drag.

A core aspect lies in the separation of the at least one interface element and the load introduction rib. The material of the at least one interface element can be adapted to the material of the front skin. Preferably, the material could be selected such that a material bonding process with the front skin can be improved. The material of the at least one interface element may differ from the material of the load introduction rib. For conducting a maintenance, the at least one interface element may simply be unfastened from the load introduction rib and reattached again, after the relevant maintenance procedure is accomplished.

This design principle provides several advantages. The outer surface of the front skin is smooth and does not comprise any rivet-induced imperfections, which lead to increasing the induced drag of the flow body. Also, the attachment process between the front skin and the load introduction rib is simplified due to the elimination of several mechanical fastening steps, such as drilling and reworking rivet holes, placing a sealant, placing rivets, smoothing, and coating the rivet connections on the outer surface. Furthermore, the material of the interface element and the load introduction rib can be chosen according to mechanical requirements. The load introduction rib may comprise a sufficiently rigid material that allows a reliable load transfer as well as a mechanical rigid integration of the at least one coupling element into the load introduction rib. However, the at least one load introduction element may comprise a different material that is adapted to the front skin, for an improved bonding. The dimensional extension of the interface element may be chosen to provide a sufficient stability and limitation of local mechanical stresses. In particular, the material of the interface element may conform the material of the front skin.

In an advantageous embodiment, the at least one interface element comprises a plastic material, preferably a thermoplastic material. It is advantageous, if the front skin of the flow body is made from a fiber reinforced plastic material, such as CFRP or the like, for improving the mechanical properties and reducing the overall weight. While it would be advantageous in general to provide more components using this material, it is conceivable that a load introduction rib made from the same material may comprise a larger cross-sectional profile in comparison to a metallic load introduction rib. Also, it may be more complicated to manufacture. However, the material of the at least one interface element may be adapted to conform the material of the front skin, such as a fiber reinforced plastic material. The respective plastic material may be a thermoset plastic material or a thermoplastic material. The plastic material constitutes a matrix for reinforcement fibers embedded therein. If the front skin comprises a thermoset matrix, it may be feasible to co-cure the front skin and the at least one interface element, such that an integral part consisting of the front skin and the at least one interface element is provided. However, if the front skin comprises a thermoplastic material as a matrix, the at least one interface element may comprise the same and both components may be welded to each other. However, gluing is also conceivable. Suitable thermoplastic materials may, for example, polyetherketoneketone (PEKK), polyetheretherketone (PEEK), polyetherimide (PEI), polycarbonate (PC), polypropylene (PP) or others.

In an advantageous embodiment, the at least one load introduction rib is made from a metallic material. For example, the load introduction rib is made from an aluminum alloy, while Titanium may also be conceivable.

In an advantageous embodiment, the at least one interface element is attached to the load introduction rib through fasteners. As mentioned above, these fasteners may include bolts, screws, nuts, rivets or the like. It is advantageous if the fasteners are removable without destruction, which is the case with using screws or nuts. For preventing a vibration-induced loosening, the fasteners may be secured through suitable securing elements, e.g., a pin.

In an advantageous embodiment, the skin comprises a thermoplastic material. The thermoplastic material may, as mentioned above, include polyetherketoneketone (PEKK), polyetheretherketone (PEEK), polyetherimide (PEI), polycarbonate (PC), polypropylene (PP) or others. The at least one interface element may comprise the same type of material, such that both components can be welded to each other.

In an advantageous embodiment, the at least one interface element is welded to the skin. If both components comprise the same thermoplastic material, welding may be conducted through ultrasonic welding, laser welding, induction welding or resistance welding. However, if the front skin comprises a thermoset material and the at least one interface element comprises a thermoplastic material, welding may be provided through using a thermoplastic coupling layer that is co-cured with the front skin, to which the at least one interface element is weldable.

In an advantageous embodiment, the at least one interface element comprises an attachment surface for attachment to the rib, wherein the bonding surface and the attachment surface are arranged at an angle of 40° to 140° to each other. The bonding surface is adapted for flushly resting on the inner surface of the front skin, wherein the bonding surface may either be welded or glued or otherwise materially bonded to the inner surface. The attachment surface may include a number of through-holes for leading fasteners through, for attachment to the respective load introduction rib. The size of the bonding surface is dimensioned to achieve a sufficiently sturdy connection to the front skin. By providing both surfaces at an angle to each other, the load introduction rib may be completely flat at the interface side and the at least one interface element creates a fastening angle.

In an advantageous embodiment, the attachment surface is arranged parallel to a main extension plane of the rib. Thus, the mechanical load acting onto the attachment surface is mainly a shear load and the available surface for providing fasteners is not strictly limited.

In an advantageous embodiment, the at least one coupling element comprises at least one lug. The respective lug comprises an opening, through which a fitting in the form of a bolt, an axle or any other suitable component can be lead through. For improving the mechanical properties, the lug may comprise a bushing made from the same or another material than the respective load introduction rib. The lug constitutes a local load interface, through which mechanical loads between the drive mechanism and the load introduction rib are transferred.

In an advantageous embodiment, the flow body comprises at least two interface elements for each load introduction rib. For example, two interface elements may be attached to the same load introduction rib. The interface elements may then extend into opposite directions and create an enlarged bonding surface. Both interface elements may be attached to the same load introduction rib through the same fasteners.

The invention further relates to a wing for an aircraft, the wing having a fixed wing body and at least one flow body according to the above, wherein the at least one flow body is movably arranged on the fixed wing body.

Still further, the invention relates to an aircraft having at least one wing according to the above and/or at least one flow body according to the above.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements. They show.

DETAILED DESCRIPTION OF THE PREFERRED EMBODIMENTS

Figures 1, 2:
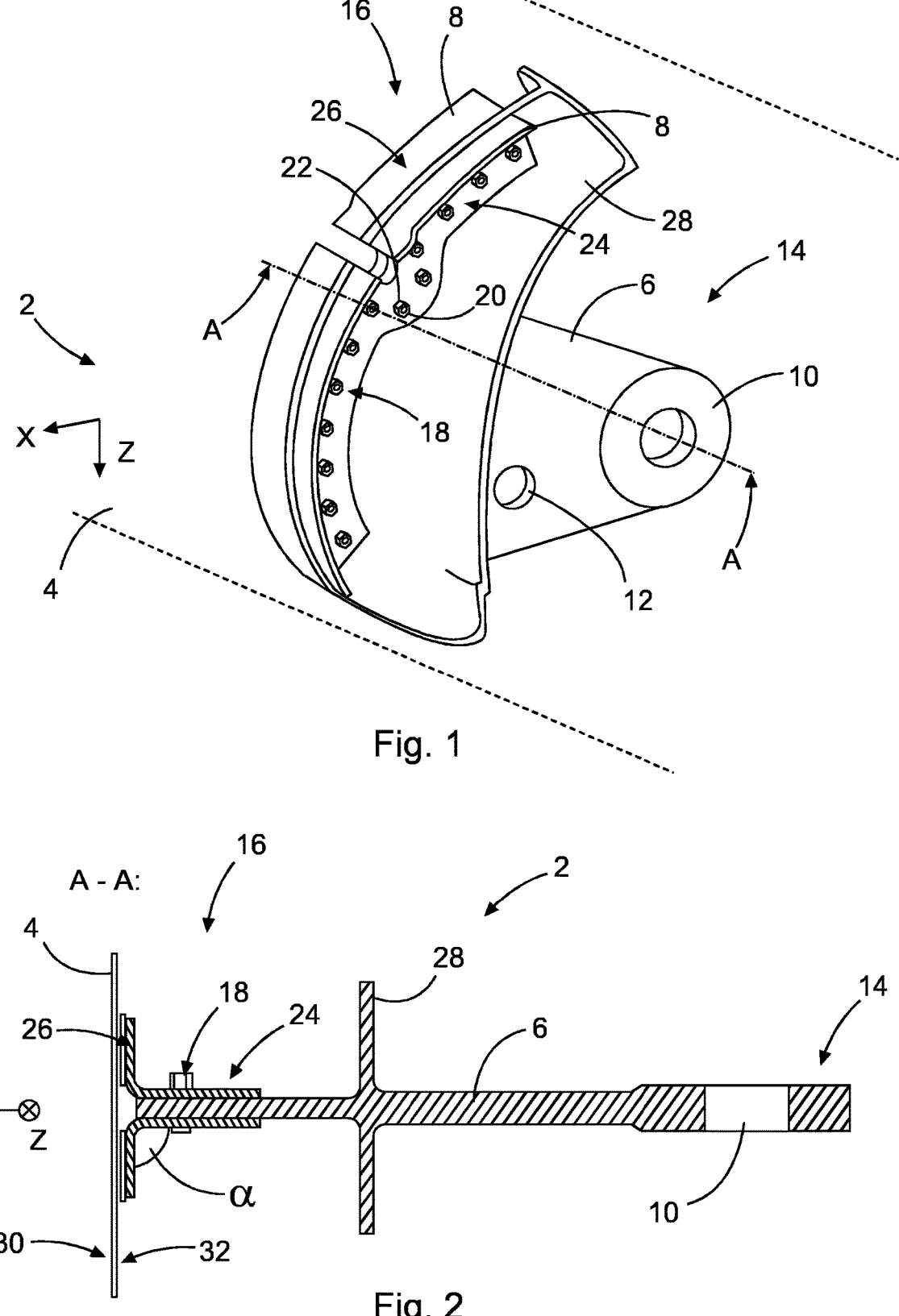
FIG. 1 shows a part of a flow body in a schematic illustration.
FIG. 2 shows a sectional view of the flow body.

FIG. 1 shows a movable flow body 2 having a front skin 4, a load introduction rib 6 and exemplarily two interface elements 8. For simplification purposes, the front skin 4 is only indicated by dashed lines and is otherwise substantially left out in this illustration. While it is conceivable, that the flow body 2 is a leading-edge slat, other types of flow bodies 2 are not ruled out. The load introduction rib 6 is exemplarily arranged parallel to a longitudinal axis (x) of an aircraft, to which it is attached. In particular, it may also be substantially parallel to a plane spanned by the longitudinal axis x and a vertical axis (2), as indicated by x and z arrows. It is further conceivable that the load introduction rib 6 is perpendicular to the local leading edge of the flow body 2.

The front skin 4 is distinctly curved to provide desired aerodynamic characteristics. Thus, the load introduction rib 6, which stiffens the front skin 4, as well as the interface elements 8 have a corresponding shape to maintain the given shape of the front skin 4. It is to be understood that several further ribs may be arranged inside the flow body 2, wherein one or two of the ribs may be provided in the form of a load introduction rib 6 as shown herein. The interface elements 8 are exemplarily made from a material sheet, which is bent to form an elongated, curved component with an angled cross-sectional profile.

In this exemplary embodiment, the front skin 4 comprises a thermoplastic material, e.g., in the form of a fiber reinforced plastic material. The fibers may include carbon, glass, aramid, or other suitable fibers. As explained later on, other materials are not ruled out and the front skin 4 may also comprise a thermoset material or a metallic material.

The load introduction rib 6 comprises two coupling elements in the form of a first lug 10 and a second lug 12. Both lugs 10 and 12 are couplable with a drive mechanism, which is not shown herein in further detail. For example, the drive mechanism may include a linkage mechanism and an actuator, which act to move the flow body 2 into a retracted position or one of several extended positions. The load introduction rib 6 may be made from an aluminum alloy and comprises usual material thicknesses and dimensions. The coupling elements 10 and 12 are arranged on a drive side 14, while the interface elements 8 are placed at a skin interface side 16, which is opposite to the drive side 14.

Here, the interface elements 8 are attached to the load introduction rib 6 through a series of fasteners 18, which exemplarily comprise bolts 20 and nuts 22. The bolts 20 are sticked through through-holes in both interface elements 8 and the load introduction rib 6, such that these elements are clamped together when fastening the nuts 22.

The interface elements 8 are exemplarily made from a thermoplastic material, which conforms the thermoplastic material of the front skin 4. Each of the interface elements 8 comprises an attachment surface 24 and a bonding surface 26. Both surfaces 24 and 26 are arranged at an angle to each other, which in this case is about 90°. Thus, each of the interface elements 8 constitutes an angle to the interface side 16 of the load introduction rib 6.

The interface elements 8 are shaped such that the bonding surfaces 26 conform the shape of the front skin 4, such that the bonding surfaces 26 rest flushly on the inner surface of the front skin 4.

In FIG. 2 a sectional view of the flow body 4 is shown, wherein the sectional plane is indicated by the letters A in FIG. 1. Here, a stiffening section 28 of the load introduction rib 6 is apparent, which is provided in the form of a projecting collar. The angle between the bonding surface 26 and the attachment surface 24 is shown as a, which in this example is about 90°. Depending on the shape and position of the flow body 2, other angles are conceivable. For example, the load introduction rib 6 may be arranged parallel to an x-z-plane of the aircraft, while the front skin 4 extends along a leading edge of the wing, which has a certain sweep angle. Thus, if two interface elements 8 are used, one of them may comprise an angle α of clearly below 90°, while the other one of them may comprise an angle α of clearly above 90°.

One of the fasteners 18 extending through both interface elements 8 and the load introduction rib 6 is indicated. Spacing and number of fasteners 18 can be selected according to the expected loads.

The bonding surfaces 26 of the interface elements 8 are bonded to an inner surface 32 of the front skin 4. The bonding may be accomplished by welding, if both interface elements 8 and front skin 4 have compatible, weldable materials. For example, the front skin 4 is that made of a thermoplastic material, which may be welded to the interface elements 8. However, it is also conceivable that the front skin 4 is made from a metallic material, which may be glued to interface elements 8 made from a plastic material or from a metallic material. Welding of a front skin 4 made from a metallic material to interface elements 8 made from a metallic material may be conducted as well. If the front skin 4 comprises a thermoset material, co-curing of the interface elements 8 arranged on the inner surface 32 or gluing both components together may be further options. In any case, the outer surface 30 of the front skin 4 remains free from any riveting connections that influence the aerodynamic behavior of the flow body 4.

FIGS. 3a to 3i show different examples of attaching one or two interface elements 8 to a load introduction rib in schematic illustrations. Further attachment options are conceivable and shall not be considered ruled out by these examples. For illustration purposes, the angled shapes of the interface elements 8 in the examples of FIGS. 3a, 3b, 3c and 3e to 3i are left out. However, is it to be understood that these interface elements 8 may include an angled shape as shown in FIG. 1 to provide a sufficiently large bonding surface 26.

Figure 3A:
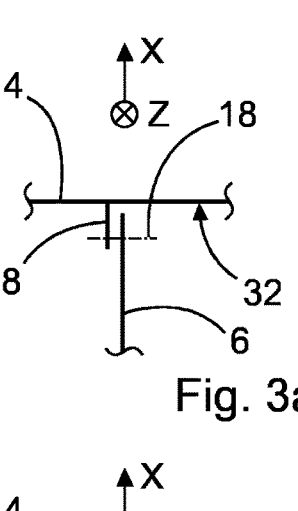
FIGS. 3a to 3i show different examples of interface elements.

FIG. 3a shows the front skin 4 having a single interface element 8 connected to the inner surface 32, wherein the load introduction rib 6 is attached to the interface elements 8 through a series of fasteners 18.

Figure 3B:
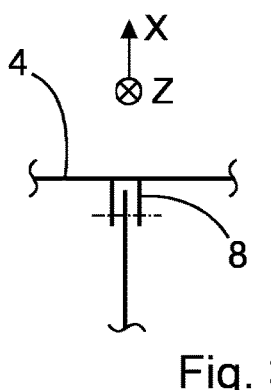

In FIG. 3b, substantially the exemplary embodiment of FIG. 2 is illustrated. Here, two interface elements 8 are connected to the front skin 4, wherein the load introduction rib 6 is enclosed between the two interface elements 8 through fasteners 18.

Figure 3C:
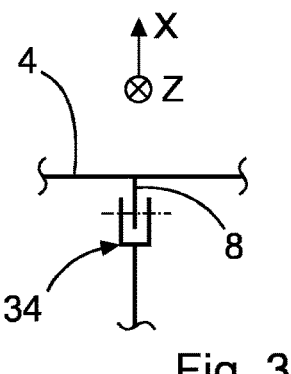

In FIG. 3c, a single interface element 8 is shown arranged at the inner surface 32, wherein the load introduction rip 6 comprises a fork 34 at the skin interface side 16, which is attached to the interface element 8 through fasteners 18. The interface element reaches into an intermediate space between both legs of the fork 34.

Figure 3D:
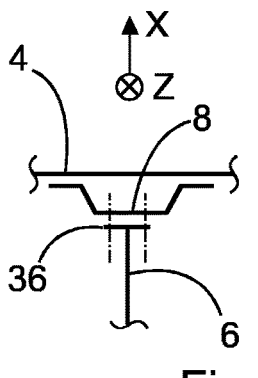

In FIG. 3*d*, a single interface element 8 having an Omega-shape is shown, wherein the open side of the interface element 8 is bonded to the inner surface 32. The load introduction rib 6 in turn comprises a flange 36, which is arranged transverse to the remaining part of the load introduction rib 6 and is attached to the interface element 8 through two series of fasteners 18 at both sides of the load introduction rib 6.

Figure 3E:
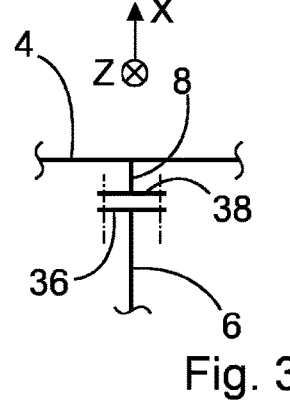

FIG. 3*e* shows a single interface element 8 with a transverse flange 38, that is attached to the transverse flange 36 of the load introduction rib 6, similar to what is shown in FIG. 3*d*.

Figure 3F:
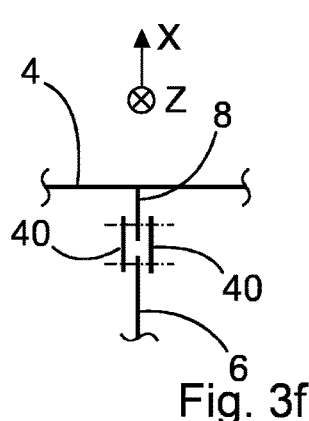

In FIG. 3*f*, a slight modification of FIG. 3*c* is shown. Here, instead of the fork 34, two lateral brackets 40 are attached to the load introduction rib 6 and the interface element 8 to enclose both elements.

Figure 3G:
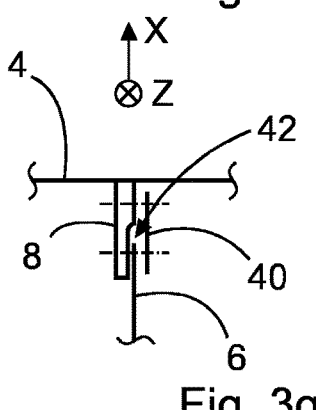

In FIG. 3*g*, a stepped blade is provided as an interface element 8 and comprises a lateral recess 42 to receive the load introduction rib 6, wherein one of the lateral brackets 40 is used to clamp the load introduction rib 6 and the interface element 8 together.

Figure 3H:
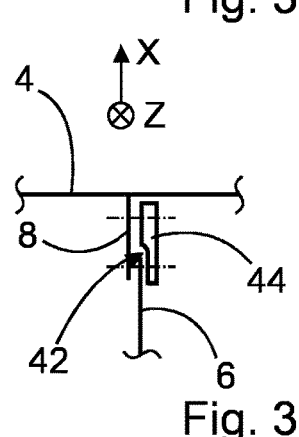

FIG. 3*h* is mechanically inverted to the solution in FIG. 3*g* and shows a single interface element 8, the load introduction rib 6 as well as a stepped bracket 44 having a lateral recess 42 for receiving the load introduction rib 6 for clamping the load introduction rib 6 and the interface element 8 together.

Figure 3I:
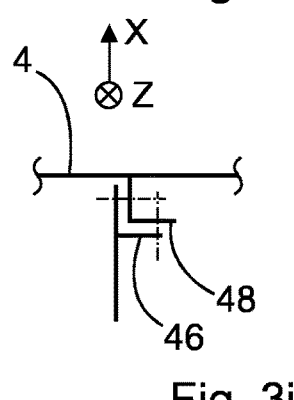

FIG. 3*i* shows the interface element 8 comprising a double-L-profile, leading to the cross-sectional profile of the interface element 8 having a transverse leg 48. The cross-sectional profile of the load introduction rib 6 comprises a correspondingly transversely extending leg 46, which flushly rests on the leg 48 of the interface element 8. The load introduction rib 6, the interface element 8 and the legs 46 and 48 are clamped together by fasteners 18.

Figure 4:
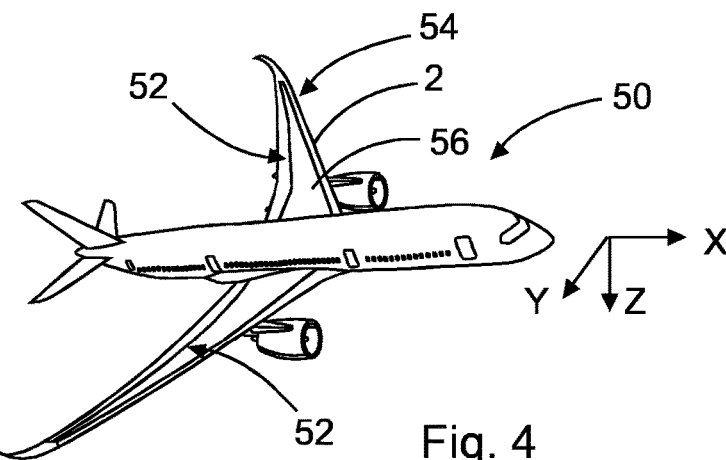
FIG. 4 shows an aircraft.

Lastly, FIG. 4 shows an aircraft 50, having wings 52 with leading edges 54 and a fixed wing body 56, at which a flow body 2 according to the above may be provided.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 movable flow body
4 front skin
6 load introduction rib
8 interface element
10 first lug
12 second lug
14 drive side
16 skin interface side
18 fastener
20 bolt
22 nut 24 attachment surface
26 bonding surface
28 stiffening section
30 outer surface
32 inner surface
34 fork
36 flange
38 flange
40 bracket
42 lateral recess
44 stepped bracket
46 leg
48 leg
50 aircraft
52 wing
54 leading edge
56 fixed wing body

The invention claimed is:

1. A movable flow body for an aircraft, comprising:
a front skin having an outer surface configured to be contacted by an ambient flow, and an inner surface opposite the outer surface, the front skin having a leading edge,
at least one load introduction rib having a skin interface side and a drive side,
at least one coupling element arranged on the drive side for coupling with a drive mechanism, and
at least one interface element,
wherein the at least one interface element comprises a bonding surface,
wherein the skin interface side of the at least one load introduction rib and the bonding surface of the at least one interface element each have a shape corresponding to a shape of the inner surface of the front skin through the leading edge of the front skin,
wherein the bonding surface of the at least one interface element is materially bonded to the inner surface of the front skin along the inner surface of the leading edge of the front skin, and
wherein the skin interface side of the at least one load introduction rib is removably attached to the at least one interface element along the inner surface of the leading edge of the front skin.

2. The flow body of claim 1, wherein the at least one interface element comprises a plastic material.

3. The flow body according to claim 1, wherein the at least one load introduction rib is made from a metallic material.

4. The flow body according to claim 1, wherein the at least one interface element is attached to the load introduction rib through fasteners.

5. The flow body according to claim 1, wherein the front skin comprises a plastic material.

6. The flow body according to claim 5, wherein the plastic material comprises a thermoplastic material.

7. The flow body according to claim 2,
wherein the front skin comprises a plastic material; and
wherein the at least one interface element is welded to the front skin.

8. The flow body according to claim 1,
wherein the at least one interface element comprises an attachment surface for attachment to the load introduction rib, and
wherein the bonding surface and the attachment surface are arranged at an angle of 40° to 140° to each other.

9. The flow body of claim 8, wherein the attachment surface is arranged parallel to a main extension plane of the load introduction rib.

10. The flow body of claim 1, wherein the at least one coupling element comprises at least one lug.

11. The flow body according to claim 1, further comprising at least two interface elements for each load introduction rib.

12. A wing for an aircraft, the wing having a fixed wing body and at least one flow body according to claim 1, wherein the at least one flow body is movably arranged on the fixed wing body.

13. An aircraft having at least one wing according to claim 12.

14. An aircraft having at least one flow body according to claim 1.

\* \* \* \* \*